March 8, 1960 Y. L. G. BRÉELLE 2,927,560
ROTARY ENGINE
Filed Nov. 22, 1957 2 Sheets-Sheet 1

INVENTOR
YVES L.G. BREELLE
BY Taulmin & Taulmin
ATTORNEYS

March 8, 1960  Y. L. G. BRÉELLE  2,927,560
ROTARY ENGINE
Filed Nov. 22, 1957  2 Sheets-Sheet 2
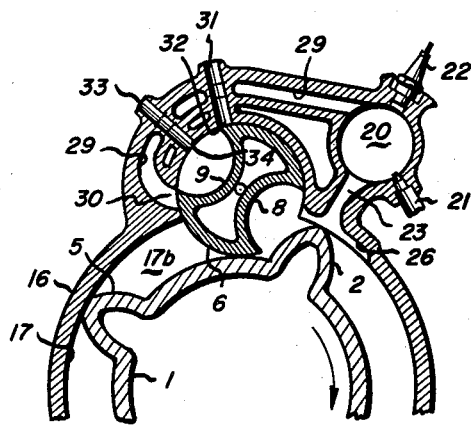
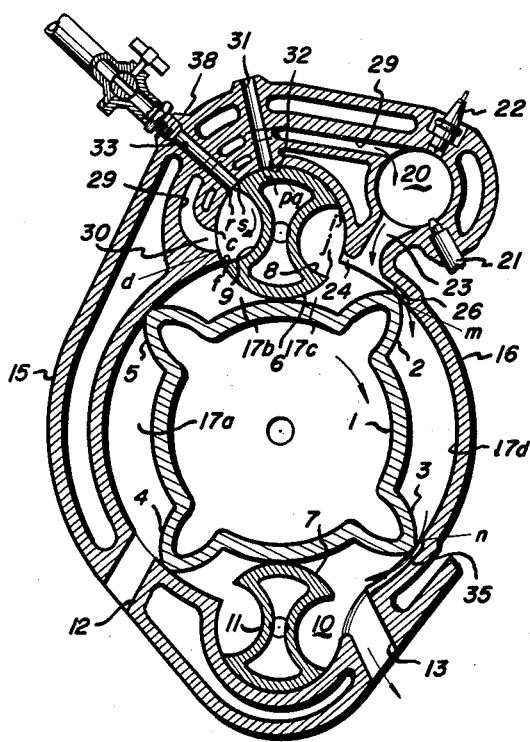
INVENTOR
YVES L. G. BREELLE
BY  Toulmin & Toulmin
ATTORNEYS

United States Patent Office 2,927,560
Patented Mar. 8, 1960

2,927,560

ROTARY ENGINE

Yves L. G. Bréelle, Rueil-Malmaison, France, assignor to Institut Français du Petrole, des Carburants et Lubrifiants Application November 22, 1957, Serial No. 698,291

Claims priority, application France November 23, 1956

18 Claims. (Cl. 123—13)

This invention relates to rotary engines of the internal combustion type, and more particularly multi-cycle engines, wherein each revolution of the engines comprises several combustion cycles.

This application comprises subject matter described in detail in my co-pending patent applications, Serial Number 574,833, filed on March 29, 1956, now abandoned; and Serial Number 688,908, filed on October 8, 1957.

It is an object of my invention to provide a rotary engine of the internal combustion type which functions as an intermediary between a four-stroke internal combustion engine and a gas turbine.

It is a further object of my invention to provide a rotary engine of the kind described which permits a more complete and more efficient utilization of the combustive mixture in the combustion chamber of the rotary engine and an improved scavenging of the combustion chamber.

In an internal combustion engine of the four-stroke motor type, air together with an introduced explosive fuel-containing mixture are compressed by a piston in a combustion chamber and ignited either by means of the compression itself (auto-ignition) or by means of a spark plug, whereupon the burning gases expand and push the piston back. The entire combustion process is effected in a space, the volume of which corresponds to the space comprised between the piston, the cylinder jacket, and the combustion chamber.

A gas turbine, on the other hand, functions differently in that, in the simplest case, it depends on the use of a compressor, which supplies compressed air to a separate combustion chamber, into which fuel is continuously injected and wherein a continuous combustion at constant pressure takes place.

Furthermore, rotary engines are known in the art in which an engine casing houses a central rotor bearing one or several rotary pistons engaging several rotary abutments or gate pistons having their rotary axes disposed parallel to the axis of the central rotor, as well as a separate combustion chamber which opens into the part of the casing housing the central rotor.

Such rotary engines are described, for instance, in the Patent 2,088,121 to R. C. Swink, and in the Patent 2,719,513 to T. E. Dezell.

The known rotary engines provided with a separate combustion space in the engine wall enclosing the central rotor and opening into the cylinder space housing the latter, suffer in particular from unsatisfactory distribution and scavenging systems.

The above-stated objects are attained and the drawbacks of the known engines of this type avoided by the rotary engine with a separate combustion chamber, or several separate combustion chambers, provided in the stator part of the engine, which comprises an improved arrangement of the separate combustion chamber in combination with means for utilizing the exploding gases and means for an improved scavenging of the combustion chamber in the stator as well as the wells provided in those gate rotors of the engine which cooperate with the combustion chamber.

The advantageous feature of rotary engines according to my invention over the known art resides, principally, in a participation of the wells in the compression-expansion controlling gate rotor with the independent combustion chamber in the stator of the engine, thus establishing a closer cooperation between the combustion chamber and the rotor, during all stages of the work cycle, such as the compression, the ignition and the subsequent expansion and scavenging stages than in the known engines.

It is, therefore, an important feature of my invention that the separate combustion chamber is at a certain instant of the work cycle in free communication through an opening or channel in the peripheral stator wall enclosing one of the gate rotors, with one well therein, while being simultaneously in communication, via a bypass channel, with another well in the same rotor.

According to another feature of the invention, separate channels may be provided for scavenging the wells in that same gate rotor, and the combustion chamber by cooperating with each other and with wells and with the bypass channel.

According to yet another feature of my invention, the connection between the combustion chamber in the stator and the central chamber of the latter housing the central rotor is enlarged by a recess in the wall of the central chamber extending the opening of the combustion chamber in the direction of movement of the rotor pistons. Thereby a more complete expansion of the exploded gases in the combustion chamber and the adjoining compartment, between the contact line of central and gate rotor on the one hand and the trailing slope of a piston on the other hand, is achieved, and the propulsory action of the expanding gases on the aforesaid trailing slope of the piston is prolonged until the next following piston completely interrupts the connection between the combustion chamber and the compartment formed between the leading slope of that last mentioned piston and the trailing slope of the preceding piston.

As another important feature of my invention, the bypass channel connecting the cavity which houses the combustion control rotor with the combustion chamber in the stator, opens tangentially into the latter; the channel preferably extends in a tangential direction from that portion of the preferably globally shaped combustion chamber which is remote from the throat of the combustion chamber opening into the central chamber of the engine.

The burning and expanding gases in the combustion chamber may be advantageously directed by the shape and direction of the throat of the combustion chamber to impinge approximately tangentially to the central rotor, on to the trailing edge of the piston passing the aforesaid throat.

In order to achieve the maximum tangential effect on the central rotor, the substantially globe-shaped combution chamber is preferably located so that its central plane, which is transverse to the axes of the rotors, is identical with the central cross-sectional plane of the rotors.

In a rotary engine according to this invention which is built as a fuel-injection engine, the fuel injection means will be preferably mounted in the wall of the combustion chamber opposite the opening of the aforesaid channel thereinto, so that the fuel jet is directed across the chamber toward the zone of that opening.

The spark plug is disposed preferably close to the opening of the bypass channel into the combustion chamber.

When injecting a fuel that requires electrical ignition, a spark plug is mounted in the roof of the globe-shaped chamber intermediate the fuel-injection nozzle or nozzles and the aforesaid channel opening.

This invention will be better understood from the description thereof in connection with the accompanying drawings, in which:

Figures 5 to 6 illustrate schematically further stages of the main parts of the rotary engine shown in Figure 1 during the scavenging phase of its operation.

Figure 1:
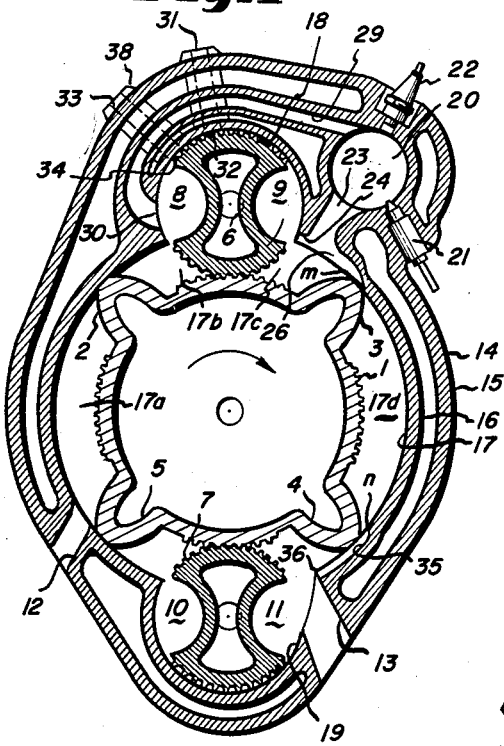
Figure 1 is a vertical transverse sectional view of a rotary engine constructed in accordance with the invention.

Referring now to the drawings more in detail, the rotary engine according to the invention exemplified therein comprises, similarly to the rotary engines described in my copending patent applications supra, a central rotor 1 provided with four identical pistons 2, 3, 4 and 5, which are preferably regularly distributed about the periphery of the rotor at angles of 360/4=90° relative to each other.

The number of pistons may, of course, vary, and if that number is $n$, they are preferably distributed regularly about the periphery of the rotor 1 at angles of $360/n$ degrees relative to each other.

In the embodiment illustrated in Figure 1, two gate rotors 6 and 7 are provided, which are each provided with recesses or wells 8 and 9, and 10 and 11, respectively, adapted for permitting the passage of the pistons 2, 3, 4 or 5 therethrough.

The wells 8 and 9 are arranged diametrically opposed to each other in the cylindrical wall of gate rotor 6, and the wells 10 and 11 are arranged in a similar manner in gate rotor 7.

Preferred shapes for these recesses are described in particular in my co-pending patent application Serial No. 688,908. The diameters of the rotors are such that the latter can rotate without friction against each other. In viwe of the fact that the central rotor 1 in Figure 1 is provided with four pistons, the diameters of the gate rotors must be each half the diameter of the central rotor.

A gear train of known construction and described in the aforesaid patent application Serial No. 574,833 supra insures the synchronous movement of the rotors.

Intake and exhaust ports 12 and 13 are provided on either side of the gate rotor 7 through the walls of the engine casing 14, and are disposed asymmetrically relative to the central vertical plane through the axes of the rotors 6, 1 and 7, in order to avoid any loss of fuel due to the passage of fresh explosive mixture into the wells of gate rotor 7 and from there into the exhaust port 13. Of course, this applies only to such engines where an explosive mixture is taken in through port 12.

The engine casing 14 comprises an outer wall 15 and an inner wall 16; the latter encloses the preferably cylindrical central bore or chamber 17, which is subdivided, according to the positions of the pistons 2, 3, 4 and 5, into several compartments of varying shape. In the position illustrated in Figure 1, these comprise compartments 17a, 17b, 17c and 17d.

Peripheral cavities 18 and 19 housing the gate rotors 6 and 7, respectively, open into the central bore 17 and are enclosed by portions of the inner casing wall 16.

A combustion chamber 20 is located independently of the rotors in the stator part of the engines, i.e., the casing 14, adjacent the gate rotor 6.

In the embodiment shown in Figure 1, a fuel injector 21 and an electrical spark plug 22 protrude from the outside of the outer casing wall 15 into the combustion chamber 20.

The combustion chamber opens through a wide throat 23 and the corresponding widening of said throat 24 into the compartment 17c of the central chamber 17, and at the same time into the peripheral cavity 18 which houses the gate rotor 6 cooperating with the combustion chamber 20.

The free communication between the combustion chamber 20 and the compartment 17c is further enlarged by a recess 26 in the inner wall 16 enclosing the central chamber 17 in the region of that compartment.

Furthermore, the combustion chamber 20 is connected by means of a channel 29 to that side of the cavity housing the gate rotor 6 which faces away from the combustion chamber. Channel 29 opens at 30 into the peripheral cavity 18 housing rotor 6 in the vicinity of where the cavity 18 opens into compartment 17b of the central chamber 17. The channel opening 30 has the cross-sectional diameter $c$—$d$, and is located at a distance from the central chamber 17, which corresponds to the distance $d$—$f$ taken in a plane perpendicular to the rotor axis.

This distance $d$—$f$ must always be smaller than the circumferential extension $i$—$j$ of the wells 8, 9 in the rotor 6, because, otherwise, the compartment 17b could not be in free communication with the combustion chamber 20.

Any insufficiently expanded gases retained in the wells 8 or 9 of rotor 6 are provided with an escape through a conduit 31 leading from an opening 32 in the wall of the cavity 18 through the outside of the engine casing 14. Opening 32 has the diameter $p$—$q$. A further conduit 33 is provided from the outside of the engine casing 14 toward the cavity 18 therein and opens in the latter at 34, where it has a diameter $r$—$s$. Opening 34 is located, for instance, intermediate the openings 30, of channel 29, and 32, of conduit 31, in the wall of cavity 18. Conduit 33 serves for scavenging the burnt residual gases from the wells 8 and 9 of rotor 6 as well as from channel 29 and the combustion chamber 20.

Near the exhaust port 13, a further recess 35 may be provided in the wall 16 of the central chamber 17, whereby the compartment 17d is brought into communication with the exhaust port 13 already prior to the time that the trailing edge of the piston originally separating the two spaces 17 and 13 has passed the entrance to port 13 at 36 (piston 4 in Figure 1), and very briefly prior to the interruption of free communication between the combustion chamber 20 and compartment 17d through piston 3 arriving at the position shown in Figure 1.

Therefore, the interval $m$—$n$ between the end of recess 26 and the beginning of recess 35 in wall 16, must be slightly shorter than the interval between the top edge of the trailing slope at the ridge of a piston and the top edge of leading slope at the ridge of the next following piston of the central rotor passing an identical reference point in the central chamber, so that the combustion chamber 20 remains in free communication with the exhaust port of a short but sufficient time to permit a substantially complete scavenging of the burnt residual gases from said combustion chamber.

It is, of course, necessary that the shafts of rotors 1, 6 and 7 are arranged parallel to each other, but it is not required that all three shafts be located in the same plane as is the case in the embodiment shown in Figure 1.

*Operation*

The operation of the rotary engine illustrated in Figure 1 will be described in detail hereinafter. This rotary engine is of the injection type and fitted out with auxiliary electrical ignition means.

The central rotor 1 is assumed to be set in clockwise rotation, for instance, by a small starting motor and a gear train described in detail in my co-pending patent applications supra.

Piston 3, after passing the intake port 12, will then suction in the combustion supporting agent or comburant, for instance, air, through that intake port 12 into the compartment designated by 17a in Figure 1, but between pistons 2 and 3 instead of 5 and 2 as shown in that figure.

Upon further rotation, pistons 2 and 3 will arrive in the position illustrated in Figure 1; considering only the air originally in the compartment between these pistons, it will be noted that the same is now compressed into the compartment 17b between piston 2 and the contact line between rotors 1 and 6.

At the instant, illustrated in Figure 1, free communication is about to be established between compartment 17b and well 8 of rotor 6, which will thus open passage to the compressed air from compartment 17b into channel 29.

Figure 2:
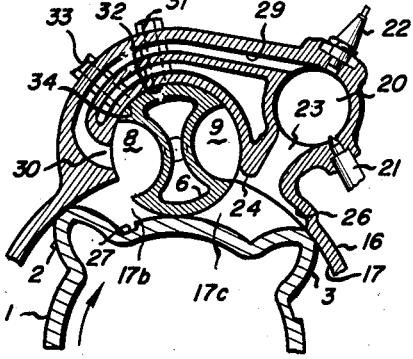
Figures 2 through 4 show schematically different positions of the main parts of the rotary engine illustrated in Figure 1, during different stages of the combustion phase.

This position of the rotors is illustrated in Figure 2, in which the central rotor 1 has rotated slightly further from the position of Figure 1.

Figure 3:
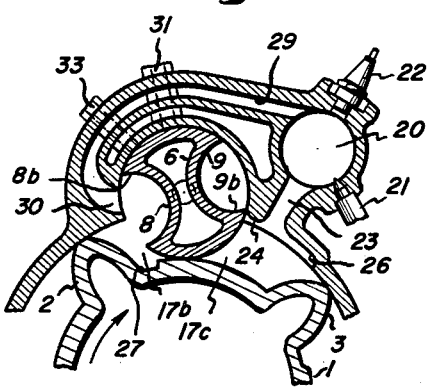

While the compressed air from compartment 17b passes through the channel 29 and fills into the combustion chamber 20, rotation of the rotors 1, 6 and 7 progresses to attain the position illustrated in Figure 3.

Figure 4:
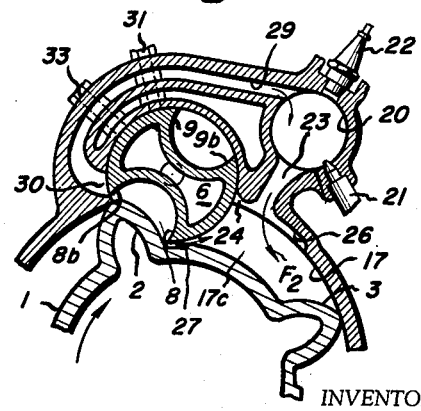

At this time, the total volume of 17b+8+29+20 +23+17c remains constant until, upon further rotation, the trailing edge 8b of well 8 of rotor 6 interrupts free communication between well 8 and compartment 17b on the one hand, and channel 29 on the other hand (Figure 4). In this instant, piston 2 is about to enter well 8.

At this time communication is interrupted between well 9 and the combustion space before fresh gases from channel 29 can penetrate into the same.

Between the instants illustrated in Figures 1 and 4, the following events take place in the constant volume designated above.

Fuel is injected by means of injector 21 preferably in the direction as indicated in the drawing, and, depending on the nature and composition of the fuel, auto ignition will take place, or the resulting mixture of fuel and comburant will be ignited by means of auxiliary ignition through spark plug 22.

A substantially globular shape of combustion chamber 20 and the arrangement of channel 29 in such a manner that it opens into that chamber tangentially, as shown in Figure 1, cause the compressed air from compartment 17b to be pressed tangentially into the combustion chamber by the advancing leading slope of piston 2 (Figures 2, 3, 4) against the injected fuel jet, so as to augment the turbulence and intensify the combustion in chamber 20.

The ignition is so timed, that the propagated flame through the explosive mixture exerts its full propulsive effect on the trailing slope of piston 3, while avoiding any substantial expansion effect in compartment 17b and well 8 through channel 29.

At the time when combustion begins, the rotors 1 and 6 have approximately the position shown in Figure 4. Rotor 9 closes opening 30 of channel 29, while the fresh gases in well 8 are urged by piston 2 out of the well through one of the small longitudinally extending recesses 27 of rotor 1 at the foot of each leading slope of the pistons into compartment 17c.

As communication between well 8 and channel 29 is interrupted, the remaining major portion of the aforesaid total volume, namely, spaces 29, 20, 23 and 17c, participate in the expansion stage of the exploded mixture, which exerts its full propulsive force $F_2$ on the trailing edge of piston 3 of rotor 1, from the shaft of which power may be taken off. Expansion in compartment 17c continues until piston 3, in approaching the position occupied by piston 4 in Figure 1, passes point n of the wall 16 of the engine casing and thereby opens a passage to the gases expanding in spaces 17d, 17c, 23, 20, 29, and 9 from behind its trailing slope into the recess 35 and to the exhaust port 13.

At the same time, piston 2 has passed the well 8 of rotor 6 and begins to expel the burnt gases in front of its leading slope.

As the next following piston 5 approaches the position occupied by piston 2 in Figure 1 (i.e. when one well of rotor 6 establishes communication between compartment 17b and channel 29), it compresses a fresh charge of air forward of its leading slope, and at the instant, corresponding to that illustrated in Figure 1, that compressed air expels any remaining burnt gases from channel 29 and scavenges most of it through combination chamber 20 and throat 23 while communication of well 8 with throat 23 is cut off at the same time or shortly thereafter (well 8 occupying the position of well 9 in Figure 1).

The above-mentioned scavenging with fresh gases from compartment 17b becomes superfluous if a different scavenging system is used which comprises channel 33, and whose function will be described hereinafter.

In order to scavenge well 8 (or 9) of these remnant waste gases, air is blown into that well through conduit 33, and leaves together with the waste gases through escape conduit 31.

This scavenging air thus removes the waste gases from the wells of rotor 6 prior to the position illustrated in Figure 6, i.e., while well 8 (or 9) still maintains communication with both conduits 31 and 33, and before well 8 (or 9) establishes communication with compartment 17b and channel 29.

As soon as channel 29 enters into communication with well 8 (or 9) the major portion of the waste gases will continue by air, for instance from a compressor (not shown) connected to socket 38 of conduit 33, through the latter and well 8 or 9 of rotor 6, and channel 29 and ultimately combustion chamber 20, and, an instant prior to the position illustrated in Figure 7, past piston 2 through compartment 17d and recess 35 toward exhaust port 13, until, an instant after the position shown in Figure 7, the leading slope of piston 2 cuts the communication of the combustion space with compartment 17d.

In order to achieve the desired cooperation between the wells of rotor 6 and the conduits 31 and 33 and channel 29, it is necessary that distances d—f, p—s and r—c are each shorter than distance i—j, i.e., the width of the wells, and that distance f—r and preferably also distance p—c, are greater than the well width i—j. All these distances are to be taken as projections into a plane perpendicular to the rotor axis.

The function of rotor 7 is well known in the art and described in my patent application supra, so that description thereof can be dispensed with here.

The scavenging conduit system of the rotary engine according to my invention, which is associated with the combustion chamber and the gate and central rotors of the engine and comprises the above-mentioned channels and conduits 29, 31 and 33 and the recesses 26 and 35, thus provides a number of advantages during each revolution of gate rotor 6, which shall be summarized hereinafter.

The excess pressure in the wells in rotor 6 is successfully decreased to the atmospheric pressure, whenever a well communicates with conduit 31; an effective scavenging of the residual gases in the wells, whenever the latter communicate simultaneously with both conduits 31 and 33; an effective scavenging of the residual waste gases from channel 29, combustion chamber 20, and the compartments 17c of the central chamber 17, whenever the wells establish communication between conduit 33 and channel 29 (Figure 6).

The distance of m—n in Figure 1 must be so dimensioned that communication between combustion chamber 20 and the escape port 13 is only maintained for a sufficiently long time to guarantee a satisfactory evacuation of the burnt gases. As soon as this communication is completely interrupted, the above-described scavenging system permits filling of the spaces of the wells 8 and 9, the combustion chamber 20, channel 29, and compartment 17b with fresh comburant, i.e., air at supercharging pressure, for instance from a compressor (not shown) which would be connected to conduit 33 through socket 38 (Figure 1), while the rotor 6 would be in the position shown in Figure 6.

This supercharging with fresh air improves the combustion as well as the rate of compression, and facilitates the internal cooling of the casing walls and the rotors, as well as the removal of undesirable combustion products such as soot and other undesirable deposits.

In addition to the scavenging system, other improvements already described in my patent application supra, such as advantageous shape of the pistons, and wells, the sealing means, etc., may be incorporated in the rotary engine according to the present invention so as to improve its general performance.

While the preferred embodiment of a rotary engine according to the present invention as illustrated in Figures 1–7 represents an injection type engine with externally controlled (electrical) ignition, it is also possible to utilize the injection and auto-ignition, so that the use of an electrical sparkplug becomes superfluous.

For this same reason, and furthermore due to the fact that the combustion takes place during a certain time interval at a constant volume, a wide range of fuels can be used in this rotary engine extending from light fuels such as gasoline to heavy diesel fuels, the influence of the firing time lag on the operation of the engine being greatly diminished.

It is furthermore possible to utilize the embodiment illustrated in Figure 1 as a carburetor-type engine by introducing an explosive mixture through the intake port 12 and utilizing exclusively the spark plug 22, but no fuel injection, in the combustion chamber 20. Or the engine may be charged mixedly with an explosive mixture through port 12 and, in addition, fuel injected through injector 21 into the combustion chamber.

Furthermore, when the rotary engine is operated as a carburetor-type engine, it is advantageous to place intake port 12 at some distance from gate rotor 7, as it is shown in Figures 1 and 7, and described in my co-pending application supra.

The gate rotors may also be arranged in two planes at an angle with each other and passing through the longitudinal axis of the central rotor, whereby the relative lengths of the intake and exhaust strokes may be varied.

Of course, the number of pistons on the central rotor, the number of gate rotors, the number of wells in the latter, and the number of combustion chambers, may be varied without departing from the scope of this invention.

Rotary engines according to my present invention offer several advantages over those of the art as well as those disclosed in my co-pending patent application supra.

Thus, cooling of the engine walls and rotors is greatly facilitated, more particularly due to the fact that the combustion chamber is fixed in the stator part of the engine and can be more easily cooled. The injector and spark plug means are mounted from the outside in the stator housing and, since they protrude into a stationary combustion chamber, are also more easily cooled. The coolant caused to pass through the gate rotors has a greater cross-sectional area available for cooling than if a combustion space is also housed in the rotors.

The functioning of the engine as well as its construction are very simple. The profiles of the pistons and rotor wells need not be so precisely machined as in the formerly described rotary engines, since, on the one hand, the pressures developed in the engine are lower, and, on the other hand, sealing during the passage of the pistons through the wells of the gate rotors is less critical.

A main advantage is the above-mentioned possibility of using a wide range of fuels having a correspondingly wide range in their octane or cetane numbers.

It will be understood that this invention is susceptible to modification in order to adapt it to different usages and conditions, and, accordingly, it is desired to comprehend such modifications within this invention as may fall within the scope of the appended claims.

What is claimed is:

1. In a rotary engine of the kind described having a stator, a central chamber therein, a central rotor coaxially arranged in said central chamber and bearing a plurality of pistons, a plurality of peripheral cavities opening into said central chamber, and a plurality of gate rotors, one in each of said cavities and arranged with their central axes parallel with the central axis of said central rotor, each of said gate rotors having wells for the passage of said pistons therethrough, the improvement comprising, in combination, a combustion chamber of substantially spherical shape in said stator, the central transverse plane of which chamber is parallel to the central plane of said central rotor and central chamber and perpendicular to the central axis of said central rotor and central chamber, said combustion chamber being in free communication with said central chamber.

2. In a rotary engine of the kind described having a stator, a central chamber therein, a central rotor coaxially arranged in said central chamber and bearing a plurality of pistons, a plurality of peripheral cavities opening into said central chamber, and a plurality of gate rotors, one in each of said cavities and arranged with their central axes parallel with the central axis of said central rotor, each of said gate rotors having wells for the passage of said pistons therethrough, said central chamber being divided into compartments corresponding to the intake, compression, power, and exhaust strokes of the engine, the improvement comprising, in combination, a combustion chamber in said stator and opening into the power compartment of said central chamber in such a manner that the wells of one of said gate rotors are capable of cooperation with said combustion chamber, and channel means opening at one end into said combustion chamber and at the other end into the cavity housing the last-mentioned cooperating gate rotor at such a zone of said cavity as to establish one freely communicating combustion space comprising said combustion chamber, said channel means, one well of said cooperating rotor, the compression compartment and the power compartment of said central chamber.

3. In a rotary engine of the kind described having a stator, a central chamber therein, a central rotor coaxially arranged in said central chamber and bearing a plurality of pistons, a plurality of peripheral cavities opening into said central chamber, and a plurality of gate rotors, one in each of said cavities and arranged with their central axes parallel with the central axis of said central rotor, each of said gate rotors having wells for the passage of said pistons therethrough, said central chamber being divided into compartments corresponding to the intake, compression, power, and exhaust strokes of the engine, the improvement comprising, in combination, a combustion chamber in said stator and opening into the power compartment of said central chamber in such a manner that the wells of one of said gate rotors are capable of cooperation with said combustion chamber, and channel means opening at one end into said combustion chamber and at the other end into the cavity housing the last-mentioned cooperating gate rotor at such a zone of said cavity as to establish one freely communicating combustion space comprising said combustion chamber, said channel means, one well of said cooperating rotor, the compression compartment and the power compartment of said central chamber, and ignition-causing means in said stator and associated with said combustion space.

4. In a rotary engine of the kind described having a stator, a central chamber therein, a central rotor coaxially arranged in said central chamber and bearing a plurality of pistons, a plurality of peripheral cavities opening into said central chamber, and a plurality of gate rotors, one in each of said cavities and arranged with their central axes parallel with the central axis of said central rotor, each of said gate rotors having wells for the passage of said pistons therethrough, said central chamber being divided into compartments corresponding to the intake, compression, power, and exhaust strokes of the engine, the improvement comprising, in combination, a combustion chamber in said stator and opening into the power compartment of said central chamber in such a manner that the wells of one of said gate rotors are capable of cooperation with said combustion chamber, and channel means opening at one end into said combustion chamber and at the other end into the cavity housing the last-mentioned cooperating gate rotor at such a zone of said cavity as to establish one freely communicating combustion space comprising said combustion chamber, said channel means, one well of said cooperating rotor, the compression and the power compartments of said central chamber, and electrically controlled ignition means in said stator and associated with said combustion space.

5. In a rotary engine of the kind described having a stator, a central chamber therein, a central rotor coaxially arranged in said central chamber and bearing a plurality of pistons, a plurality of peripheral cavities opening into said central chamber, and a plurality of gate rotors, one in each of said cavities and arranged with their central axes parallel with the central axis of said central rotor, each of said gate rotors having wells for the passage of said pistons therethrough, said central chamber being divided into compartments corresponding to the intake, compression, power, and exhaust strokes of the engine, the improvement comprising, in combination, a combustion chamber in said stator and opening into the power compartment of said central chamber in such a manner that the wells of one of said gate rotors are capable of cooperation with said combustion chamber, and channel means opening at one end into said combustion chamber and at the other end into the cavity housing the last-mentioned cooperating gate rotor at such a zone of said cavity as to establish one freely communicating combustion space comprising said combustion chamber, said channel means, one well of said cooperating rotor, and the compression and power compartments of said central chamber; and a plurality of axially extending recesses in the peripheral wall of said central rotor, each of the recesses being located at the foot of the leading slope of each piston.

6. In a rotary engine of the kind described having a stator, a central chamber therein, a central rotor coaxially arranged in said central chamber and bearing a plurality of pistons, a plurality of peripheral cavities opening into said central chamber, and a plurality of gate rotors, one in each of said cavities and arranged with their central axes parallel with the central axis of said central rotor, each of said gate rotors having wells for the passage of said pistons therethrough, said central chamber being divided into compartments corresponding to the intake, compression, power, and exhaust strokes of the engine, the improvement comprising, in combination, a combustion chamber in said stator and opening into the power compartment of said central chamber, one of said gate rotors being adapted for cooperation with said combustion chamber, and channel means opening at one end into said combustion chamber and at the other end into the cavity housing the last-mentioned cooperating gate rotor at such a zone of said cavity as to establish one freely communicating combustion space comprising said combustion chamber, said channel means, one well of said cooperating rotor, and the compression and power compartments of said central chamber and fuel injection means associated with said combustion chamber and adapted for injecting fuel into said combustion chamber toward the opening zone of said channel means thereinto.

7. In a rotary engine of the kind described having a stator, a central chamber therein, a central rotor coaxially arranged in said central chamber and bearing a plurality of pistons, a plurality of peripheral cavities opening into said central chamber, and a plurality of gate rotors, one in each of said cavities and arranged with their central axes parallel with the central axis of said central rotor, each of said gate rotors having wells for the passage of said pistons therethrough, said central chamber being divided into compartments corresponding to the intake, compression, power, and exhaust strokes of the engine, the improvement comprising, in combination, a combustion chamber in said stator and opening into the power compartment of said central chamber, one of said gate rotors being adapted for cooperation with said combustion chamber, and channel means opening at one end into said combustion chamber and at the other end into the cavity housing the last-mentioned cooperating gate rotor at such a zone of said cavity as to establish one freely communicating combustion space comprising said combustion chamber, said channel means, one well of said cooperating rotor, and the compression and power compartments of said central chamber and fuel injection means associated with said combustion chamber and adapted for injecting fuel into said combustion chamber toward the opening zone of said channel means thereinto, and electrically controlled ignition means in said combustion chamber.

8. In a rotary engine of the kind described having a stator, a central chamber therein, a central rotor coaxially arranged in said central chamber and bearing a plurality of pistons, a plurality of peripheral cavities opening into said central chamber, and a plurality of gate rotors, one in each of said cavities and arranged with their central axes parallel with the central axis of said central rotor, each of said gate rotors having wells for the passage of said pistons therethrough, said central chamber being divided into compartments corresponding to the intake, compression, power, and exhaust strokes of the engine, the improvement comprising, in combination, a combustion chamber in said stator and opening into the power compartment of said central chamber, one of said gate rotors being adapted for cooperation with said combustion chamber, and channel means opening at one end into said combustion chamber and at the other end into the cavity housing the last-mentioned cooperating gate rotor at such a zone of said cavity as to establish one freely communicating combustion space comprising said combustion chamber, said channel means, one well of said cooperating rotor, and the compression and power compartments of said central chamber and fuel injection means associated with said combustion chamber and adapted for injecting fuel into said combustion chamber toward the opening zone of said channel means thereinto, and electrically controlled ignition means in said combustion chamber, intermediate said injection means therein and the opening of said channel means thereinto, whereby said fuel is injected past said ignition means toward said channel opening.

9. In a rotary engine of the kind described having a stator, a central chamber therein, an intake port and an exhaust port from the latter to the outside of said stators, a plurality of peripheral cavities opening into said rotor chamber, a central rotor coaxially arranged in said central chamber and bearing a plurality of rotary pistons, and a plurality of gate rotors, one in each of said cavities and arranged with their central axes parallel with the central axis of said central rotor, each of said gate rotors having wells for the passage of said pistons therethrough, said central chamber being divided into compartments corresponding to the intake, compression, power, and exhaust strokes of the engine, the improvement comprising, in combination, a combustion chamber in said stator and opening into the power compartment of said central chamber, one of said gate rotors being adapted for cooperation with said combustion chamber, and channel means opening at one end into said combustion chamber and at the other end into the cavity housing the last-mentioned cooperating gate rotor at such a zone of said cavity as to establish one freely communicating combustion space comprising said combustion chamber, said channel means, one well of said cooperating rotor, and the compression and power compartments of said central chamber, and fuel injection means associated with said combustion chamber and adapted for injecting fuel into said combustion chamber toward the opening zone of said channel means thereinto, electrically controlled ignition means in said combustion chamber, a first recess in the wall of said central chamber next adjacent and enlarging the opening from said combustion chamber into said central chamber in the direction of travel of said pistons therethrough, a second recess in the wall of said central chamber near the exhaust port in the stator and extending the opening of the exhaust port in said central chamber in the direction contrary to the movement of said pistons therethrough, the distance between the nearest end of said first and second recesses being somewhat shorter than the distance between the top edge of the trailing slope of one piston and the top edge of the landing slope of the next-following piston of said central rotor, and a plurality of axially extending recesses in the peripheral wall of said central rotor, each of said recesses being located at the foot of the leading slope of each piston so as to secure communication between gases compressed by a piston in a well of said cooperating gate rotor and the power compartment adjament to said rotor.

10. In a rotary engine of the type described and having an engine stator, a central chamber therein, an intake port and an exhaust port from the latter to the outside of said stator, a central rotor in said chamber and provided with pistons subdividing the annular space between said central rotor and the wall of said central chamber into a plurality of compartments, the improvement of, in combination, an independent combustion chamber in said stator and opening with a wide throat into said central chamber, a cavity in said stator disposed peripherally to and intersecting said central chamber, a combustion-controlling gate rotor in said cavity the central axis of which is disposed in parallel to the central axis of said central rotor and provided with at least two wells in the surface thereof adapted for the passage of said pistons therethrough, channel means connecting the end of said combustion chamber remote from where it communicates with said central chamber, with said cavity housing said gate rotor, said channel means opening into said cavity at a distance from where said cavity intersects said central chamber which is shorter than the peripheral width of said wells.

11. In a rotary engine of the type described and having an engine stator, a central chamber therein, an intake and exhaust port from the latter to the outside of said stator, a central rotor in said chamber and provided with pistons subdividing the annular space between said central rotor and the wall of said central chamber into a plurality of compartments, the improvement of, in combination, an independent combustion chamber in said stator and opening with a wide throat into said central chamber, a cavity in said stator disposed peripherally to and intersecting said central chamber, a combustion-controlling gate rotor in said cavity the central axis of which is disposed in parallel to the central axis if said central rotor and provided with at least two wells in the surface thereof adapted for the passage of said pistons therethrough, channel means connecting the end of said combustion chamber remote from where it communicates with said central chamber, with said cavity housing said gate rotor, said channel means opening into said cavity at a distance from where said cavity opens into said central chamber which is shorter than the peripheral width of said wells and scavenging conduits comprising an outlet conduit from said cavity to the outside of said engine stator, and an inlet conduit from the outside to said cavity the opening of said inlet conduit in said cavity being intermediate the openings of said channel and of said outlet conduit said inlet conduit being adapted for the introduction of a scavenging medium, the projection into a plane perpendicular to the central axis of the gate rotor of the distance between openings of said outlet and said inlet conduits in the wall of said cavity and of the distance from said inlet conduit to the opening of said channel into said cavity being shorter and the projection in the same plane of the distance from the opening of said inlet conduit in the wall of said cavity to where said cavity intersects said central chamber being larger than the peripheral width in a plane perpendicular to the central axis of said gate rotor, of each well in the latter.

12. The improvement as described in claim 10, further comprising a recess in the wall of said central chamber next adjacent and enlarging the opening from said combustion chamber into said central chamber in the direction of travel of said pistons therethrough.

13. The improvement as described in claim 10, further comprising a first recess in the wall of said central chamber next adjacent and enlarging the opening from said combustion chamber into said central chamber in the direction of travel of said pistons therethrough; a second recess in the wall of said central chamber near the exhaust port in the stator and extending the opening of the exhaust port in said central chamber in the direction contrary to the movement of said pistons therethrough, the distance between the nearest end of said first and second recesses being somewhat shorter than the distance between the top edge of the trailing slope of one piston and the top edge of the leading slope of the next-following piston of said central rotor and a plurality of axially extending recesses in the peripheral wall of said central rotor, each of said recesses being located at the foot of the leading slope of each piston so as to secure communication between gases compressed by a piston in a well of said cooperating gate rotor and the power compartment adjacent to said rotor.

14. A rotary engine, comprising rotor means and stator means, a combustion chamber and a central chamber in said stator means, said rotor means comprising a central power rotor in said central chamber and a plurality of gate rotors, one of said gate rotors being associated with said combustion chamber, said latter gate rotor having a plurality of wells provided therein, said combustion chamber being in free communication with said central chamber at all times, channel means in said stator for establishing repeatedly simultaneous communication between said combustion chamber and said wells of said gate rotor associated with said combustion chamber so as to effect recurrent filling and thereafter scavenging of said combustion chamber and gate rotor wells.

15. A rotary engine of the fuel-injection type, comprising, in combination, an engine stator, a central chamber therein, an intake and exhaust port from the latter to the outside of said stator, a central rotor in said chamber and provided with pistons subdividing the annular space between said central rotor and the wall of said central chamber into a plurality of compartments, an independent combustion chamber in said stator and opening with a wide throat into said central chamber, a cavity in said stator disposed peripherally to said central chamber and opening freely communicatingly into said central chamber, a combustion-controlling gate rotor in said cavity the central axis of which is disposed in parallel to the central axis of said central rotor and provided with at least two wells in the surface thereof adapted for the passage of said pistons therethrough, channel means connecting the end of said combustion chamber remote from where it communicates with said central chamber, with said cavity housing said gate rotor said channel means opening into said cavity at a distance from where said cavity intersects said central chamber which is shorter than the peripheral width of said wells.

16. A rotary engine of the fuel-injection type, comprising, in combination, an engine stator, a central chamber therein, an intake and exhaust port from the latter to the outside of said stator, a central rotor in said chamber and provided with pistons subdividing the annular space between said central rotor and the wall of said central chamber into a plurality of compartments corresponding respectively to the intake, compression, power and exhaust strokes of the engine, an independent combustion chamber in said stator and opening with a wide throat into said central chamber, a cavity in said stator disposed peripherally to said central chamber and opening freely communicatingly into said central chamber, a combustion-controlling gate rotor in said cavity the central axis of which is disposed in parallel to the central axis of said central rotor and provided with at least two wells in the surface thereof adapted for the passage of said pistons therethrough, channel means connecting the end of said combustion chamber remote from where it communicates with said central chamber, with said cavity housing said gate rotor at such distance from where said cavity opens into said central chamber that, any well of said combustion-controling gate rotor establishes communication between the compression compartment of the engine and said channel, and scavenging conduits comprising an outlet conduit from said cavity to the outside of said engine stator, and an inlet conduit from the outside to said cavity and adapted for the introduction of a scavenging medium, the distance between said outlet and said inlet conduits being shorter, and the distance from said inlet conduit to the opening of said channel into said cavity being also shorter than the peripheral width, in a plane transverse to the central axis of said gate motor, of each well in the latter.

17. A rotary engine of the fuel-injection type, comprising, in combination, an engine stator, a central chamber therein, an intake and exhaust port from the latter to the outside of said stator, a central rotor in said chamber and provided with pistons subdividing the annular space between said central rotor and the wall of said central chamber into a plurality of compartments, an independent combustion chamber in said stator and opening with a wide throat into said central chamber, a cavity in said stator disposed peripherally to said central chamber and opening freely communicatingly into said central chamber, a combustion-controlling gate rotor in said cavity the central axis of which is disposed in parallel to the central axis of said central rotor and provided with at least two wells in the surface thereof adapted for the passage of said pistons therethrough, channel means connecting the end of said combustion remote from where is communicates with said central chamber, with said cavity housing gate rotor at such distance from where said cavity opens into said central chamber that any well of said combustion-controlling gate rotor establishes communcation between the compression compartment of the engine and said channel, scavening conduits comprising an outlet conduit from said cavity to the outside of said engine stator, and an inlet conduit from the outside to said cavity and adapted for the introduction of a scavenging medium, the distance between said outlet and said inlet conduits being shorter, and the distance from said inlet conduit to the opening of said channel into said cavity being also shorter than the peripheral width, in a plane transverse to the central axis of said gate rotor, of each well in the latter, and recess in the wall of said central chamber next adjacent and enlarging the opening from said combustion chamber into said central chamber in the direction of travel of said pistons therethrough.

18. A rotary engine of the fuel-injection type, comprising, in combination, an engine stator, a central chamber therein, an intake and exhaust port from the latter to the outside of said stator, a central rotor in said chamber and provided with pistons subdividing the annular space between said central rotor and the wall of said central chamber into a plurality of compartments, an independent combustion chamber in said stator and opening with a wide throat into said central chamber, a cavity in said stator disposed peripherally to said central chamber and opening freely communicatingly into said central chamber, a combustion-controlling gate rotor in said cavity the central axis of which is disposed in parallel to the central axis of said central rotor and provided with at least two wells in the surface thereof adapted for the passage of said pistons therethrough, channel means connecting the end of said combustion chamber remote from where it communicates with said central chamber, with said cavity housing said gate rotor at such distance from where said cavity opens into said central chamber that any well of said combustion-controlling gate rotor establishes communication between the compression compartment of the engine and said channel, scavenging conduits comprising an outlet conduit from said cavity to the outside of said engine stator, and an inlet conduit from the outside to said cavity and adapted for the introduction of a scavenging medium, the distance between said outlet and said inlet conduits being shorter, and the distance from said inlet conduit to the opening of said channel into said cavity being also shorter than the peripheral width, in a plane transverse to the central axis of said gate rotor, of each well in the latter, a first recess in the wall of said central chamber next adjacent and enlarging the opening from said combustion chamber into said central chamber in the direction of travel of said pistons therethrough, and a second recess in the wall of said central chamber near the exhaust port in the stator and extending the opening of the exhaust port in said central chamber in the direction contrary to the movement of said pistons therethrough, the distance between the nearest end of said first and second recesses being somewhat shorter than the distance of two successive pistons of said central rotor.

References Cited in the file of this patent

FOREIGN PATENTS

| 436,502 | France | Jan. 24, 1912 |
| 106,385 | Austria | May 10, 1927 |